3,752,879
PROCESS FOR MANUFACTURING SODIUM PHOSPHATES

Giorgio Cozza, Milan, and Carlo Scaglia, Busto Arsizio, and Filippo Barilli, Milan, Italy, assignors to Societa Italiana Resine S.p.A., Milan, Italy
Filed Dec. 10, 1970, Ser. No. 96,815
Claims priority, application Italy, Dec. 23, 1969, 26,208/69
Int. Cl. C01b 15/16, 25/26
U.S. Cl. 423—315       3 Claims

ABSTRACT OF THE DISCLOSURE

The degree of salification of phosphoric acid in its part neutralisation with sodium hydrate for sodium tripolyphosphate manufacture is controlled by withdrawing samples, titrating to convert wholly to disodium phosphate then to convert the same sample wholly back to monosodium phosphate, and controlling the admission of sodium hydrate to the neutralisation according to the relative amounts of the titrating agents required. The titration is preferably potentiometric, making use of the inflections in the curve at these points.

---

The present invention relates to improvements in the manufacture of sodium salts of phosphoric acid. More precisely, it relates to the manufacture of those products which are constituted essentially by monosodium phosphate and disodium phosphate which can be used in the manufacture of sodium tripolyphosphate.

It is well known that sodium tripolyphosphate is used in the formulation of detergent compositions in that it not only improves their detergent power but also acts as a sequestering agent for the calcium and magnesium ions contained in water. It is also known that sodium tripolyphosphate is obtained by thermally treating monosodium phosphate and disodium phosphate according to the following reaction:

$$2Na_2HPO_4 + NaH_2PO_4 \rightarrow Na_5P_3O_{10} + 2H_2O$$

It is obvious that for the satisfactory completion of such reaction and for a high degree of purity in the sodium tripolyphosphate it is necessary to use a product with a controlled and constant degree of salification.

For this purpose, it is essential to maintain in such a product a molar ratio $Na_2O/P_2O_5$ which is as close as possible to the stoichiometric value for the reaction described, this value being equal to 1.66.

In fact, for molar ratios $Na_2O/P_2O_5$ other than 1.66 more or less important quantities of by-products of reaction are obtained in the finished product, so reducing the yield and purity of the sodium tripolyphosphate. The constancy of the ratio $Na_2O/P_2O_5$ is a vital factor, particularly in continuous processing, if, following thermal treatment, it is desired to obtain a product with uniform characteristic features over a period of time.

From the foregoing, it is obviously important to control the degree of salification in the reaction to neutralise the phosphoric acid by using aqueous sodium hydrate which is sodium hydroxide.

For this purpose, it is not normal to resort to quantitative analysis of the volumes of acid and base reagents since, in a continuous process, exact analysis of the quantity of phosphoric acid produced by the wet process is extremely difficult.

For this reason, it is preferable in practice to determine the degree of salification or to measure the pH of the salified product manually, regulating the supply of reagents on a basis of the comparison of this result with a prefixed value.

Even such a control does not however produce completely satisfactory results.

Figure 1:
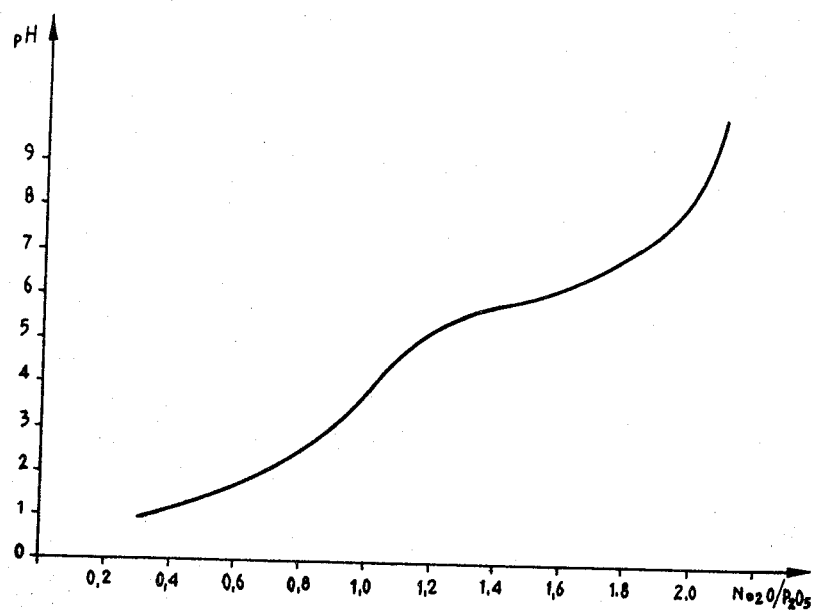

In fact, referring now to the attached FIG. 1 which sets out in ordinates the pH values and in abscissae the molar ratios $Na_2O/P_2O_5$, it will be noted from the pattern of the phosphoric acid neutralisation curve that in the working range (pH approx. 6.8), small variations in pH result in considerable variations in the ratio fo $Na_2O/P_2O_5$.

Proceeding then in the manner described and using the control apparatus normally available commercially, it is not possible to obtain a precise control of the phosphoric acid salification reaction. Now, a process has been found by which it is possible to eliminate the aforesaid disadvantages and carry out the phosphoric salification reaction by using aqueous sodium hydradte continuously and under controlled conditions, obtaining products of reaction with predetermined and strictly constant ratios of $Na_2O/P_2O_5$. Essentially, this process resides in:

Continuously feeding phosphoric acid and aqueous sodium hydrate to an agitated reactor, the quantity of aqueous sodium hydrate being less than that theoretically necessary to convert the acid into the disodium salt form, but greater than that necessary to convert the acid to the monosodium salt form;

In controlling the ratio $Na_2O/P_2O_5$ in the products of reaction by taking samples, adding to those samples an aqueous sodium hydrate solution of known titre in a quantity adapted to transform the phosphoric acid completely to the disodium phosphate form, a further addition to such samples of an aqueous mineral acid solution of known titre in a quantity adapted to convert all the phosphoric acid into the monosodium phosphate form;

In maintaining the desired value of the ratio $Na_2O/P_2O_5$ in the products discharged from the neutralisation reactor by regulating in that reactor the supply of the reagents as a function of the volumes of base and acid solution of known titre, needed to have in the samples taken phosphoric acid in the form of disodium phosphate and monosodium phosphate respectively.

It is obvious that the phosphoric acid may also be supplied to the neutralisation reactor in partly neutralised form, or in any case at a degree of salification less than that which it is intended to obtain in the final product of reaction. In practice, according to the process of the present invention, the phosphoric acid, for example that obtained by the wet method from phosphorite, is continuously fed to a neutralising reactor together with aqueous sodium hydrate.

During neutralisation, temperatures of the order of 85 to 90° C. are maintained, the ratio $Na_2O/P_2O_5$ in the products of reaction being controlled so that it is maintained at a definite and constant level.

More precisely, according to the process of the present invention, the values of the ratio $Na_2O/P_2O_5$ are recorded in samples taken from the neutralisation reactor and diluted by deionised water by the fact that to such samples are added an aqueous sodium hydrate solution of known titre in a quantity corresponding to that required for all the acid to acquire disodium salified form, followed by the addition to the same samples of an aqueous solution of a mineral acid of known titre in a quantity corresponding to that needed for all the phosphoric acid to assume its monosodium salified form.

In practice, the addition of the base solution is carried out until the pH value in the sample equals 8 while the acid solution until the pH value is equal to 4, corresponding to two bends in the neutralisation curve for phosphoric acid with aqueous soda, as shown in FIG. 1 and recording the two bends by the potentiometric method.

It is obvious that in this way the readings of the volumes of solutions of known titre are extremely accurate and it is therefore possible accurately to determine the ratio $Na_2O/P_2O_5$ in the products of neutralisation, from a simple difference in volumes of the solutions titred.

In this way, it is possible to regulate the supply of raw materials to the reactor so as to discharge a product having a constant degreee of neutralisation and at desired values of the molar ratio $Na_2O/P_2O_5$ and preferably equal to 1.66. In the preferred form of embodiment of the process according to the present invention, all the operations described are performed automatically by a system which provides for the taking of samples from the reactor, their dilution with deionised water, the addition of the aqueous sodium hydrate solution of known titre up to a pH value equal to 8, reading of the volume of base solution utilised, the further addition of an aqueous mineral acid solution of known titre up to pH 4, the reading of the volume of acid solution used, determination of the degree of neutralisation of the sample on a basis of the volumes of base and acid solutions used and the transmission of a signal to a controller for regulating the proportions of sodium hydrate:phosphoric acid supplied.

This system can be constituted by a titrimeter connected to a memory unit which transmits the signal to a flow controller.

The basic advantage of the process according to the present invention resides in the fact that it makes it possible to obtain products of neutralisation from phosphoric acid which have controlled and constant characteristics, the said products being transformable into sodium tripolyphosphate with high yields and constant properties over a period of time.

By using the processes according to the present invention, it is not necessary to take accurately measured samples from the neutralisation reactor, and this constitutes an undisputable further advantage, bearing in mind the fact that the said reactor accommodates a solution containing from 20 to 50% of soluble phosphates, at crystallisation temperature, in the case of the upper limit of concentration, greater than approx. 60° C. and containing solid matter in suspension.

Figure 2:
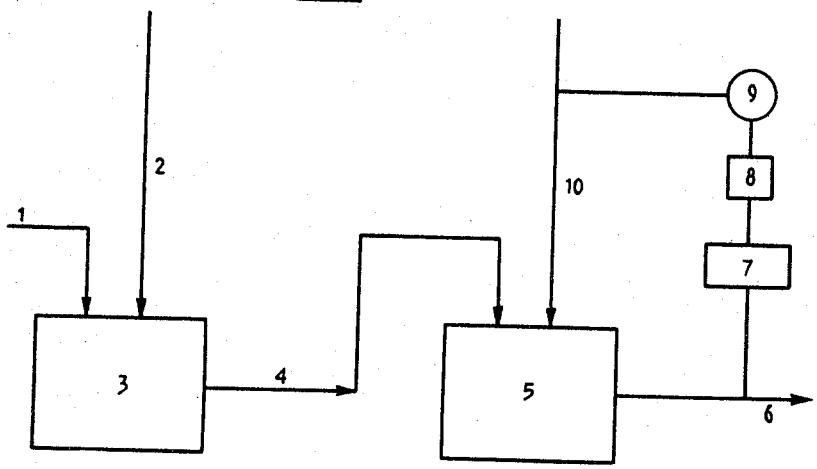

FIG. 2 shows a form of embodiment of the process of the present invention.

The phosphoric acid supplied through the line 1 is purified in the vessel 3; through the line 2, active carbon and barium carbonate or other substances capable of purifying the acid are supplied to the same vessel.

The purified acid is then transferred to the neutralisation vessel 5 through the pipe 4, while aqueous sodium hydrate is supplied through 10.

In the vessel 5, the product of neutralisation of phosphoric acid forms, the conditions being so regulated that a predetermined and constant molar ratio $Na/O/P_2O_5$ is achieved, being preferably equal to 1.66.

For this purpose, a titrimeter 7 automatically takes samples from the line 6, dilutes them by means of deionised water and determines their degree of neutralisation by the method described hereinabove.

Signals are then transmitted to the memory unit 8 which in turn acts on the flow controller 9, which finally regulates the supply of aqueous sodium hydrate.

What we claim is:
1. A process for controlling the degree of salification of phosphoric acid and maintaining a constant

$$Na_2O/P_2O_5$$

molar ratio of about 1.66 in the products of neutralization which can be used in the manufacture of sodium tripolyphosphate comprising:
(a) continuously feeding to an agitated reactor phosphoric acid and aqueous sodium hydroxide, the amount of sodium hydroxide fed to the reactor being less than that amount theoretically required to convert the phosphoric acid into its disodium salt form but greater than that amount theoretically required to convert the phosphoric acid into its monosodium salt form;
(b) withdrawing samples from the reaction product leaving the reactor and adding to each sample a first amount of an aqueous solution of sodium hydroxide of known titre necessary to convert the phosphoric acid in each sample completely to its disodium phosphate form and subsequently adding to each sample a second amount of an aqueous mineral acid solution of known titre necessary to convert the phosphoric acid in each sample completely to its monosodium phosphate form; and
(c) regulating the amount of phosphoric acid and sodium hydroxide fed to the reactor as a function of the volumes of said first and second amounts to thereby maintain a constant $Na_2O/P_2O_5$ ratio equal to about 1.66 in the reaction products leaving the reactor.

2. A process according to claim 1, wherein each sample withdrawn from the reaction product leaving the reactor has added thereto a first amount of an aqueous solution of sodium hydroxide of known titre necessary to convert the sample to a pH of 8 and then adding to each sample a second amount of an aqueous mineral acid solution of known titre necessary to convert the sample to a pH of 4 and then regulating the amounts of phosphoric acid and sodium hydroxide fed to the reactor as a function of the volumes of said first and second amounts to maintain said constant $Na_2O/P_2O_5$ ratio in the reaction products leaving the reactor, wherein said fixed value of the $Na_2O/P_2O_5$ ratio is selected and automatic means is provided to regulate the amounts of phosphoric acid and sodium hydroxide fed to the reactor to achieve said fixed $Na_2O/P_2O_5$ ratio.

3. A process according to claim 1, wherein the temperature of the material in the agitated reactor is on the order of 85 to 90° C.

References Cited
UNITED STATES PATENTS

| | | | |
|---|---|---|---|
| 2,747,964 | 5/1956 | Bacon et al. | 23—107 |
| 3,409,392 | 11/1968 | Shaver | 23—106 |
| 3,449,068 | 6/1969 | Hartlapp et al. | 23—106 X |
| 2,621,671 | 12/1952 | Eckfeldt | 23—253 A |

OSCAR R. VERTIZ, Primary Examiner

G. A. HELLER, Assistant Examiner

U.S. Cl. X.R.

23—230 A